United States Patent [19]

Pittman et al.

[11] Patent Number: 5,445,414
[45] Date of Patent: Aug. 29, 1995

[54] INFLATABLE OCCUPANT RESTRAINT CUSHION

[75] Inventors: Edgar H. Pittman, Spartanburg; Mark A. Hornung, Inman, both of S.C.

[73] Assignee: Milliken Research Corporation, Spartanburg, S.C.

[21] Appl. No.: 277,618

[22] Filed: Jul. 20, 1994

[51] Int. Cl.⁶ .............................................. B60R 21/16
[52] U.S. Cl. ................................................. 280/743.1
[58] Field of Search ................ 280/728 R, 743 R, 731

[56] References Cited

U.S. PATENT DOCUMENTS

| | | | |
|---|---|---|---|
| 2,234,065 | 4/1936 | Vogt | 383/210 |
| 2,701,878 | 2/1955 | Davis | 2/21 |
| 3,072,270 | 1/1963 | Tolby et al. | 410/119 |
| 3,276,670 | 10/1966 | Harvey | 383/77 |
| 3,358,903 | 12/1967 | Stefano et al. | 383/108 |
| 3,618,978 | 11/1971 | Klove, Jr. et al. | 280/730 R |
| 3,810,654 | 5/1974 | DeBano, Jr. et al. | 280/728 R |
| 4,004,828 | 1/1977 | Sogabe et al. | 280/743 R |
| 4,235,453 | 11/1980 | Lawson et al. | 280/743 R |
| 4,491,217 | 1/1985 | Weder et al. | 206/45.33 |
| 4,944,529 | 7/1990 | Backhaus | 280/743 R |
| 5,087,071 | 2/1992 | Wallner et al. | 280/743 R |
| 5,090,729 | 2/1992 | Watanabe | 280/743 R |
| 5,277,230 | 1/1994 | Sollars, Jr. | 139/389 |
| 5,342,087 | 8/1994 | Oda | 280/728 R |
| 5,348,341 | 9/1994 | Webber | 280/728 R |

FOREIGN PATENT DOCUMENTS 1307286  9/1962  France ............................. 460/217

*Primary Examiner*—Kenneth R. Rice
*Attorney, Agent, or Firm*—Terry T. Moyer; James M. Robertson

[57] ABSTRACT

An expansible occupant restraint cushion is provided. The restraint cushion includes a first section of material having a plurality of perimeter edges and "Z" profile lap structures disposed along selected perimeter edges. Each "Z" profile lap structure includes a first fold formed along a fold line in opposed relation to a perimeter edge and a second fold reverse in direction to the first fold formed along a fold line intermediate the fold line of the first fold and the opposing perimeter edge to yield an outboard attachment margin. The restraint cushion further includes a second section of material in opposed mating relation to the folded first section of material. This second section of material is adjoined to the first folded section of material at the outboard attachment margins of the "Z" profile lap structures. A related method for forming the cushion of the present invention is also provided.

33 Claims, 7 Drawing Sheets

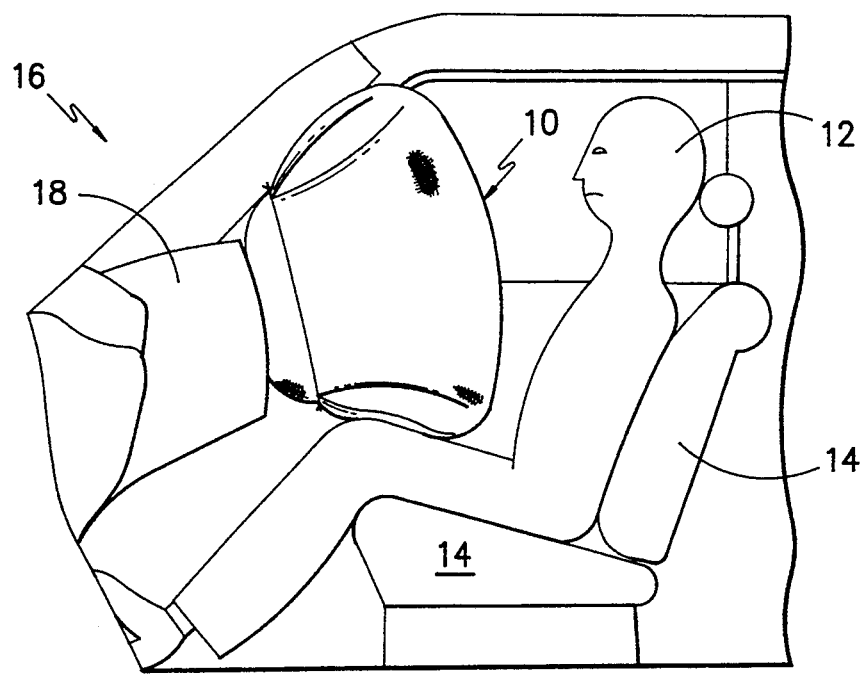
FIG. -1-
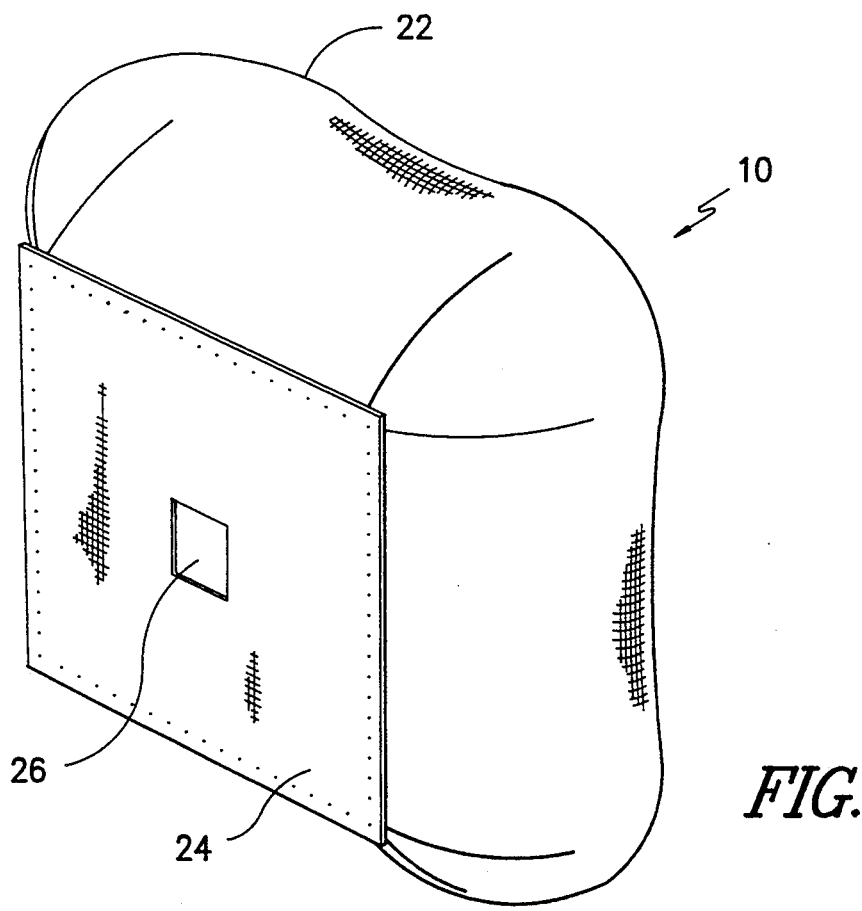
FIG. -2-

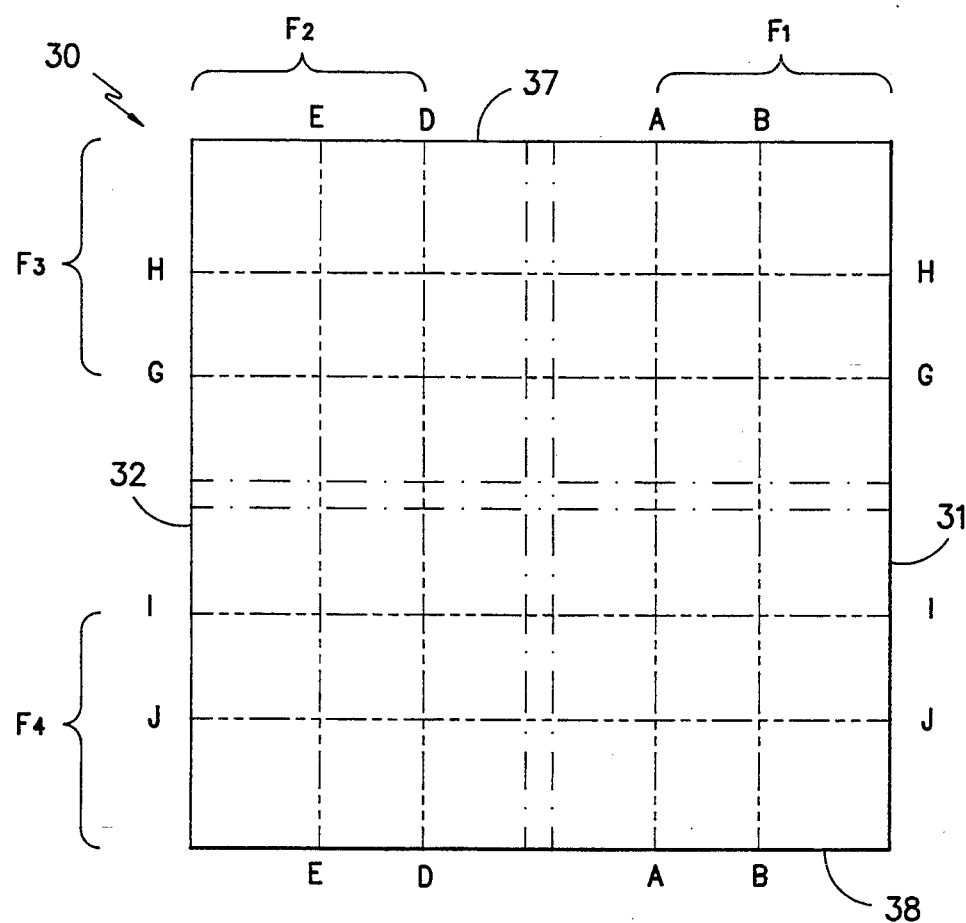
FIG. -3-
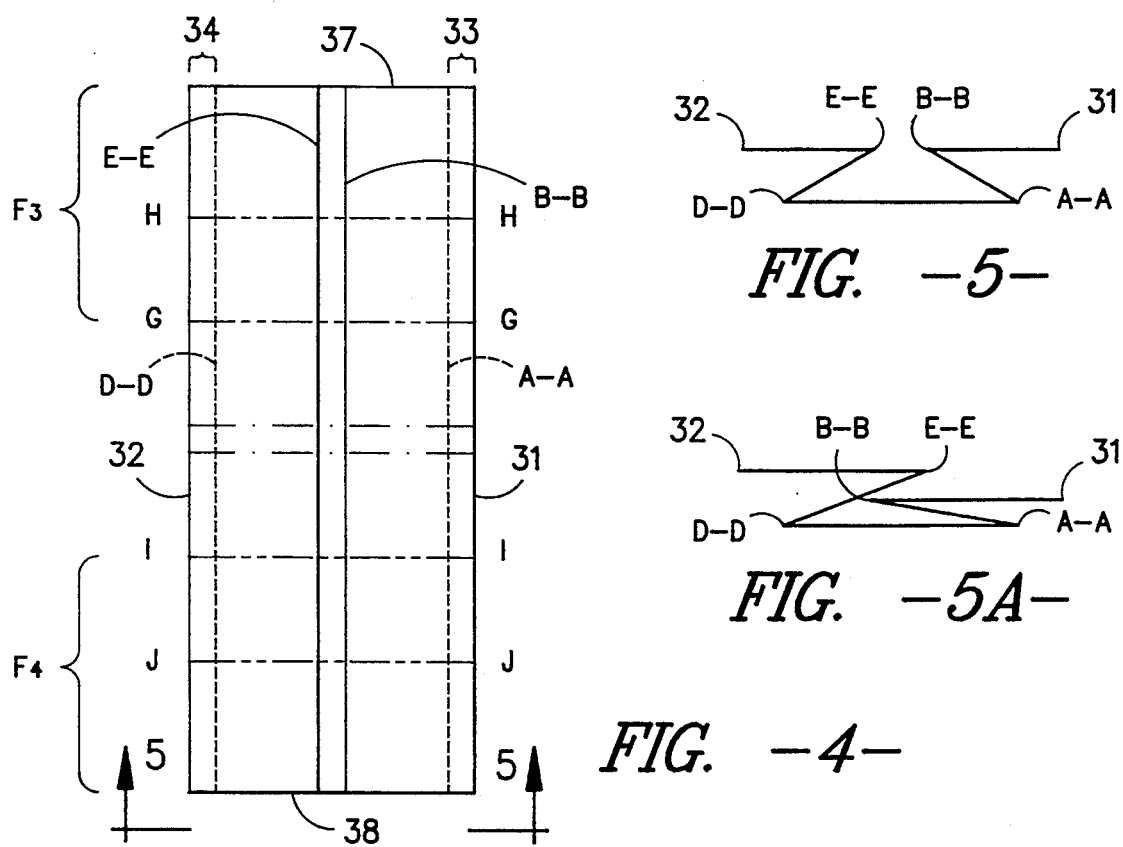
FIG. -4-
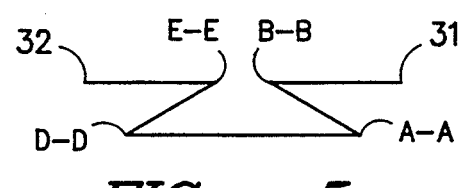
FIG. -5-
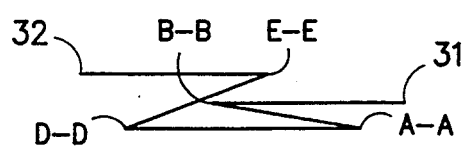
FIG. -5A-

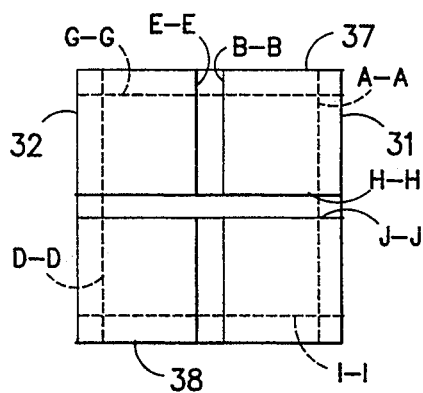
FIG. -6-
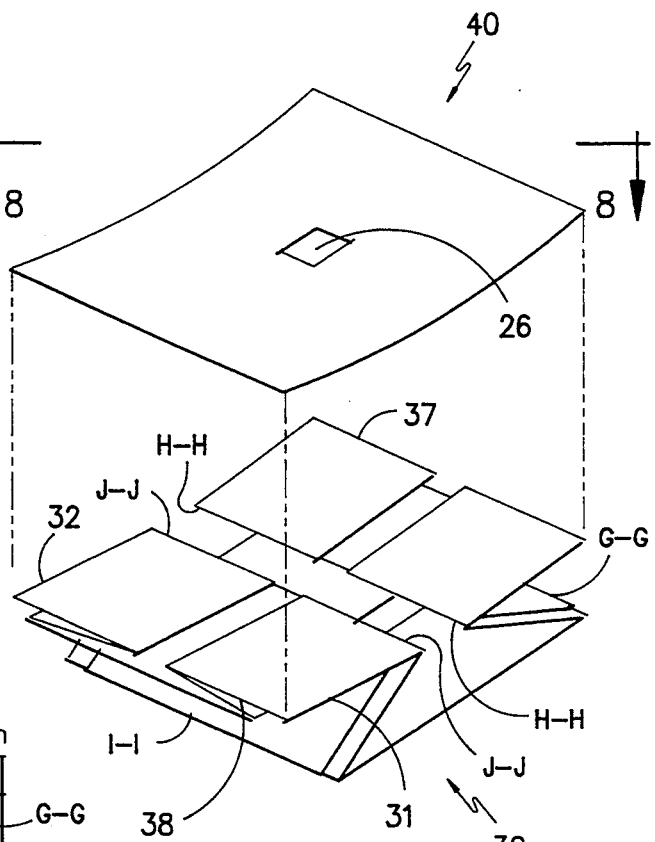
FIG. -7-
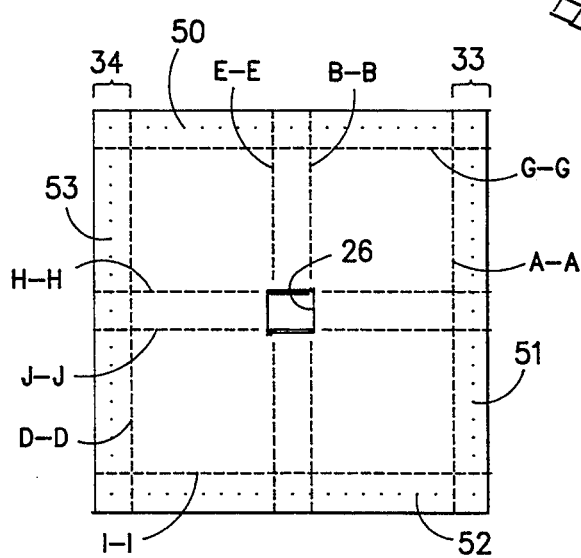
FIG. -8-

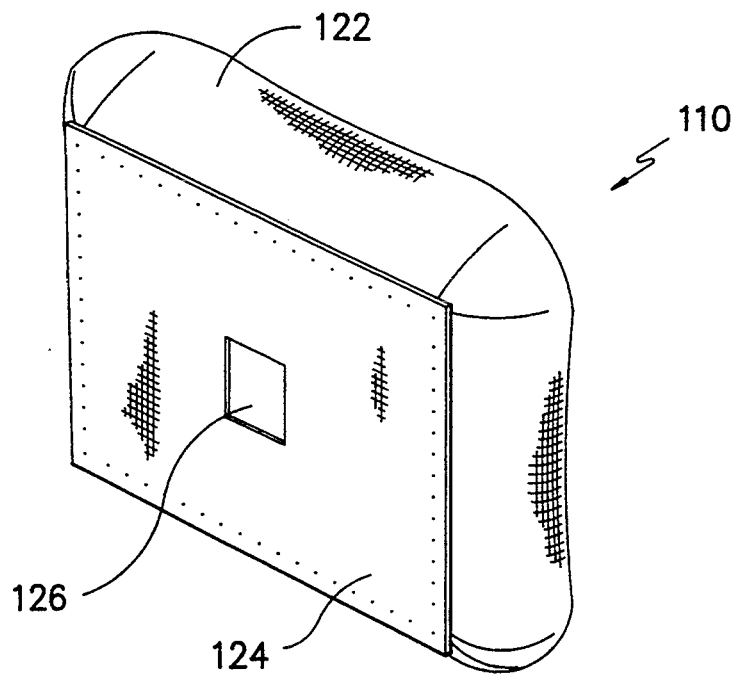
FIG. -9-
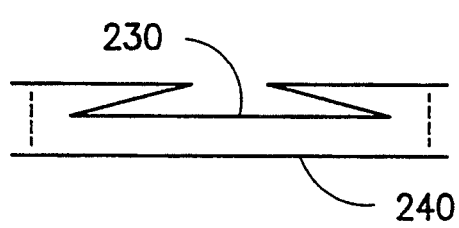
FIG. -10-
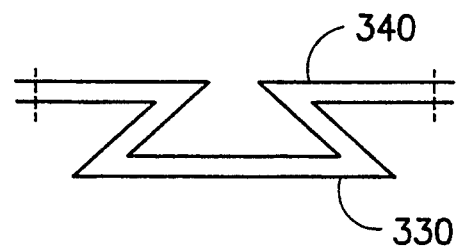
FIG. -11-
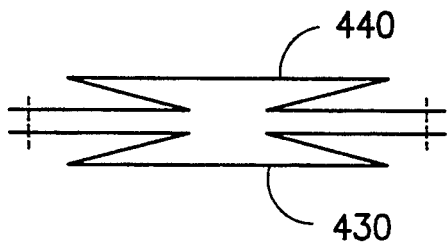
FIG. -12-
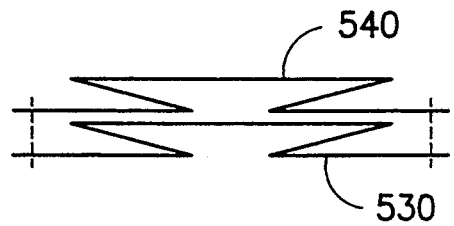
FIG. -13-

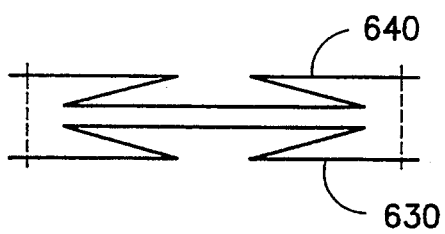
FIG. —14—
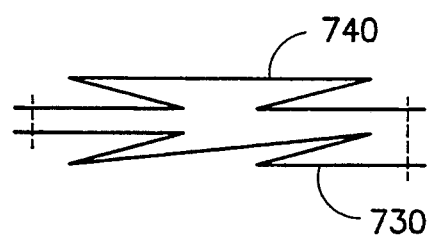
FIG. —15—
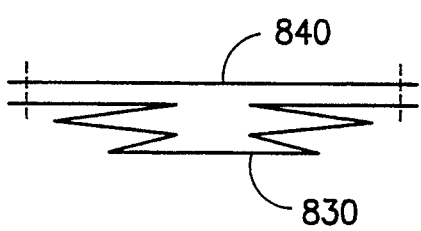
FIG. —16—
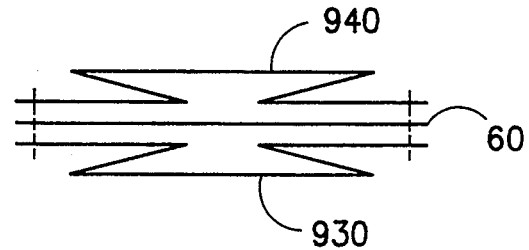
FIG. —17—

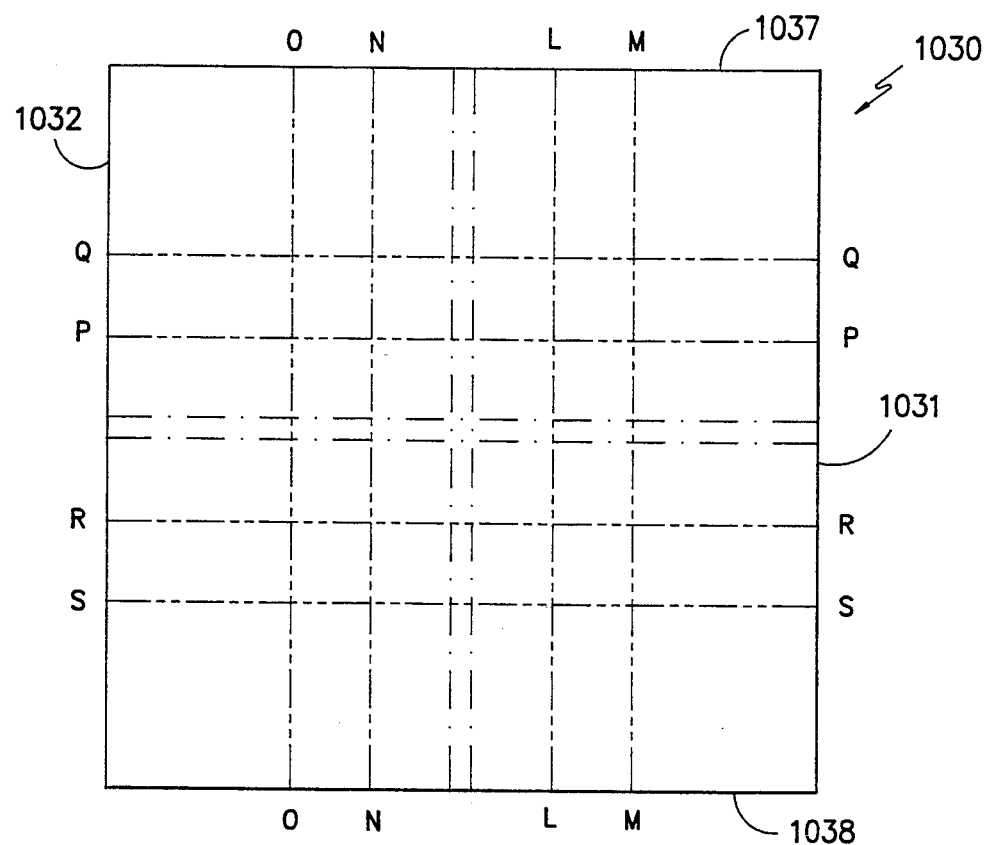
FIG. -18-
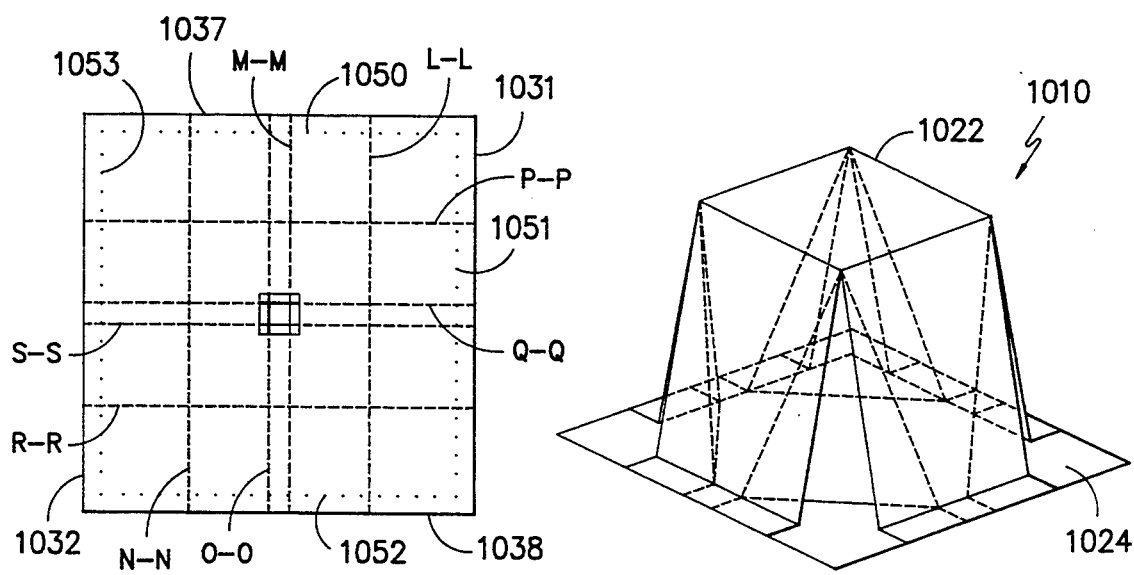
FIG. -19-    FIG. -20-

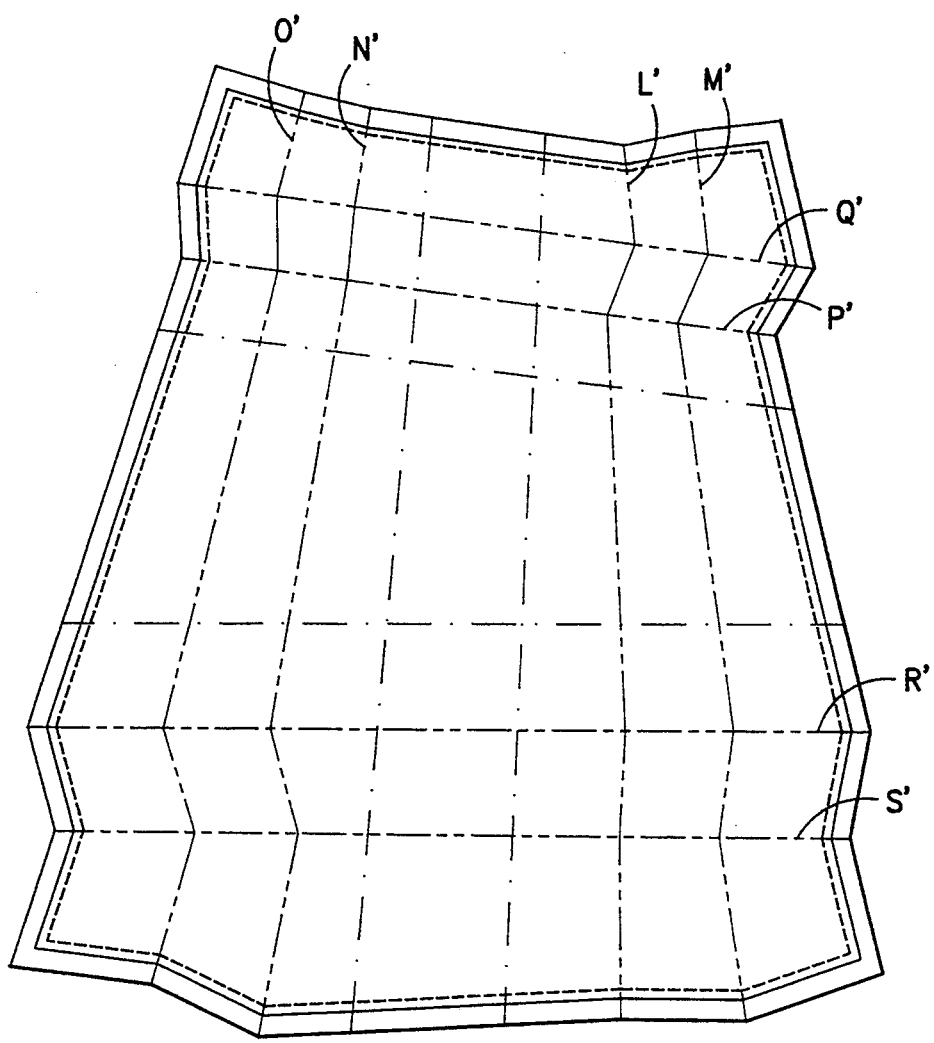
FIG. -21-
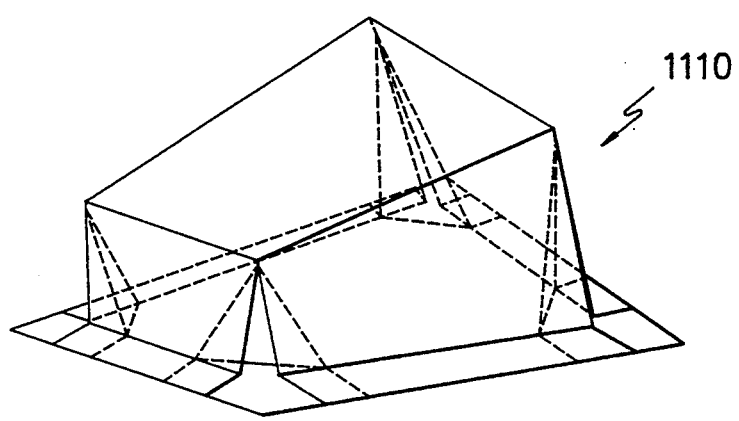
FIG. -22-

INFLATABLE OCCUPANT RESTRAINT CUSHION

FIELD OF THE INVENTION

The present invention relates to an inflatable occupant restraint cushion formed from simple geometry material blanks and a method for production of such occupant restraint cushions involving easily automated folding and adjoining steps.

BACKGROUND

An inflatable restraint cushion which is commonly referred to as an airbag housed on a fixed portion of a vehicle body in front of an occupant seat plays an important roll in protecting occupants in the vehicle from injury due to collision against the vehicle body. A vehicle airbag assembly typically includes an inflator and inflatable cushion coupled to the inflator. The inflatable cushion typically includes a gas inlet opening which is positioned to accept inflation fluid from the inflator. A typical airbag assembly will also generally include a cover which is coupled to a container for housing the cushion and which, together with the container, forms a modular receptacle for the cushion. One such airbag assembly is disclosed in U.S. Pat. No. 5,284,358 to Rhein issued Feb. 8, 1994 the teachings of which are incorporated herein by reference.

An airbag assembly is generally attached to a structural portion of the vehicle. By way of example only, the airbag assembly disposed on the passenger side of a typical automobile may be coupled with the support structure for the vehicle instrument panel or dashboard and the cover may form a part of the instrument panel. When coupled with a vehicle, the airbag assembly operates to deploy the airbag at the onset of a vehicle collision. Specifically, a gas generating agent in the inflater induces a chemical reaction by a collision signal from a collision detecting sensor when the deceleration of the vehicle exceeds a certain predetermined level. The inflatable cushion is instantaneously inflated and expanded by the generated reaction gas. Upon deployment and inflation, the inflatable cushion receives a vehicle occupant thrown forward by inertia and thereby protects the vehicle occupant from a secondary collision against the vehicle body. Details regarding cushion deployment and configuration are disclosed in U.S. Pat. No. 4,944,529 to Backhaus issued Jul. 31, 1990; U.S. Pat. No. 5,087,071 to Wallner, et al. issued Feb. 11, 1992; and U.S. Pat. No. 5,090,729 to Watanabe issued Feb. 25, 1992, the teachings of all of which are incorporated herein by reference.

Airbags which are presently used on the driver's side of a vehicle are typically formed by sewing two substantially round sections of material together to provide an expanded barrier between the driver and the steering column. Airbags which have been used to protect vehicle passengers, on the other hand, have typically been formed from rather complex geometric shapes so as to obtain the desired final expanded configuration to properly fit the relatively large space present between the passenger seat and the instrument panel or front windshield. Such practices have lead to inefficiencies regarding the complete utilization of construction materials and complicated sewing practices. In light of these infirmities, there is a need for an airbag which is formed from a small number of material segments which can be sewn or otherwise joined together on a flat surface environment but which can nonetheless be expanded to a sufficiently complex geometry to provide protection to an occupant located in a passenger seat. These needs are addressed by providing an occupant restraint cushion formed by the introduction of lap structures having overlapping interior folds and outboard attachment margins adjacent selected periphery edges to form a folded material blank and thereafter adjoining another section of material to the perimeter of the folded structure along the outboard attachment margins to provide an expansible cushion.

OBJECTS AND SUMMARY OF THE INVENTION

It is a general object of the present invention to provide an occupant restraint cushion formed from simple material sections by use of easily automated folding and attachment practices.

In that respect, it is an object of the present invention to provide a method for forming an expansible cushion from two flat material sections.

It is a related object of the present invention to provide a method for forming an expansible cushion from two flat fabric blanks which can be folded and joined together such that controlled complex geometries for use on the passenger side of the vehicle may be achieved upon inflation.

It is a further related object of the present invention to provide a method for forming an expansible cushion which may have complex expanded geometries and which is easily formed by automated processes.

Accordingly, it is a feature of the present invention to provide an expansible cushion formed by introducing overlapping folds including outboard attachment margins along the perimeter edges of a first section of material and thereafter joining a second section of material to the folded section of material along the outboard attachment margins of the folded fabric section.

It is a subsidiary feature of the present invention to provide a method for forming an expansible cushion having an expanded geometry of substantial depth from two quadrilateral fabric sections.

It is yet a further subsidiary feature of the present invention to provide a method for forming an expansible cushion having substantial depth and a complex shape wherein the complex shape is imparted by introducing overlapping folds forming webs of substantially trapezoidal or triangular shape along selected perimeter edges.

It is still a further subsidiary feature of the present invention to provide a method for forming an expansible cushion from a plurality of folded sections of material adjoined in overlaying relation to one another by substantially straight seams introduced by flat sewing operations.

In accordance with one aspect of the present invention an expansible occupant restraint cushion is provided. The restraint cushion includes a first section of material having a plurality of perimeter edges and a "Z" profile lap structure disposed along at least one perimeter edge. The "Z" profile lap structure includes a first fold disposed in opposing relation to a perimeter edge. The "Z" profile lap structure further includes at least a second fold reverse in direction to the first fold disposed along a line between the first fold and the perimeter edge within the first section of material. The "Z" profile lap structure yields a layered configuration including at least three overlapping interior layers and an attachment margin disposed outboard of the overlapping interior layers. A second section of material in opposed mating relation to the folded first section of material is adjoined to folded first section of material within the outboard attachment margin by appropriate attachment means.

In accordance with another aspect of the present invention, a method for manufacturing an expansible occupant restraint cushion is provided. The method involves the introduction of overlapping "Z" profile folded lap structures including outboard attachment margins along selected perimeter edges of a first section of material having a plurality of perimeter edges. A second section of material is joined to the folded fabric section about the perimeter thereof along the outboard attachment margins to form an expansible envelope. At least one of the first or second sections of material preferably includes a mouth for the introduction of an inflating media. Additional material may be secured about the mouth for attachment to an inflating device. At least one of the first or second sections of fabric may also be provided with vent openings to release the inflating medium following inflation. The expansible envelope may be turned inside out to provide a smooth contact surface for the user.

According to a related aspect of the invention, a method for forming an expansible occupant restraint cushion of complex geometry is provided. The method involves the introduction of substantially trapezoidal and/or triangular folded lap structures to form triangular or trapezoidal webs along selected perimeter edges of a multi-edged section of material. A second section of material which may be folded is adjoined to the first section of material around the periphery of the first section.

BRIEF DESCRIPTION OF THE DRAWINGS

FIG. 1 is a cut-away side view of vehicle for transporting an occupant illustrating the deployment of an inflatable restraint cushion according to the present invention.

FIG. 2 is a rear profile view of the inflatable restraint cushion illustrated in FIG. 1.

FIG. 3 is a top plan view of a blank of material illustrating fold lines for use in the potentially preferred practice of the present invention to form the inflatable restraint cushions illustrated in FIGS. 1 and 2.

FIG. 4 is an overhead view of the blank of material shown in FIG. 3 following the introduction of longitudinal folds in the potentially preferred practice of the present invention.

FIG. 5 is a schematic of the folded profile of the blank of material illustrated in FIG. 4 taken generally along line 5—5 thereof, illustrating the longitudinal folds introduced in the potentially preferred practice of the present invention including outboard attachment margins.

FIG. 5A is a schematic of the profile of a blank of material similar to that shown in FIG. 5, but wherein the folded flap sections extend beyond the center of the blank of material to overlap one another.

FIG. 6 is an overhead view of the blank of material illustrated in FIG. 4 following the introduction of lateral folds thereto.

FIG. 7 is a perspective view illustrating a potentially preferred assembly practice for an inflatable restraint cushion according to the present invention.

FIG. 8 is an overhead view of the assembly practice illustrated in FIG. 7 showing the lines of peripheral attachment between material sections within the outboard attachment margins according to the preferred practice of the present invention.

FIG. 9 shows an alternative embodiment of the restraint cushion of elongated configuration formed by the practice of the present invention.

FIGS. 10-17 show profile schematics of some alternative assembly practices for the restraint cushion according to the present invention.

FIG. 18 is an alternative folding plan view similar to that shown in FIG. 3 wherein the material blank fold lines are oriented to yield broad outboard attachment margins.

FIG. 19 is an overhead view similar to FIG. 8 illustrating the attachment of a second section of material to the material blank folded along lines as illustrated in FIG. 18.

FIG. 20 is an elevation view illustrating the expanded substantially symmetrical truncated pyramidal configuration resulting from use of the material blank folded along lines as illustrated in FIG. 18 and attached to a second section of material as illustrated in FIG. 19.

FIG. 21 is another alternative embodiment of a fold structure for a material blank for use in practice of the present invention illustrating non-parallel fold lines for use in generating complex expanded geometries.

FIG. 22 is an elevation view illustrating the expanded asymmetrical truncated pyramidal configuration resulting from use of the material blank folded as illustrated in FIG. 20.

While the invention will be described and disclosed in connection with certain preferred embodiments and procedures, it is in no way intended to limit the invention to those specific embodiments. Rather, it is intended to cover all such alternative embodiments, modifications and equivalents as fall within the spirit and scope of the invention as defined by the appended claims

DETAILED DESCRIPTION OF PREFERRED EMBODIMENTS

Turning now to the drawings, wherein like reference numerals denote like elements in the various views, in FIG. 1 is shown a fully deployed inflatable restraint cushion 10 in opposing relation to an occupant 12 located on the front seat 14 of a vehicle 16 such as an automobile, airplane or the like. As shown, the cushion 10 may be deployed outwardly from the dash panel 18 from a position directly opposed to the occupant 12. It is to be understood, however, that the cushion 10 may likewise be deployed from any other desired location in the vehicle 16 including the steering wheel (not shown), the vehicle side panels, the floor or the backrest of the front seat 14 for disposition in opposing relation to a rear passenger (not shown).

A potentially preferred embodiment of the inflatable restraint cushion 10 of the present invention is illustrated in rear perspective in FIG. 2. As illustrated, the inflatable restraint cushion 10 preferably includes a body portion 22 and a base portion 24 which are joined together by stitching or other appropriate attachment practices as may be known to those of skill in the art. In the potentially preferred embodiment, the base portion 24 preferably includes at least one inlet 26 for the acceptance of inflation media from an inflator. Both the base portion 24 and the body portion 22 may also include vents (not shown) for the release of the inflation media subsequent to inflation.

In the preferred embodiment of the present invention, the inflatable restraint cushion 10 is formed from fabric woven from nylon 6,6 available from E.I. DuPont deNemours in Wilmington, Delaware although other materials including, without limitation, other polyamides, polyesters, and polyacrylonitriles may also be utilized. Such fabrics may be either coated or non-coated as desired. While woven fabrics may be preferred, alternative materials of construction such as nonwovens or polymer films may likewise be utilized if desired. Moreover, it is contemplated that different materials may be used in different portions of the inflatable cushion 10 to achieve desired characteristics of air permeability and strength.

The potentially preferred assembly practice for the inflatable restraint cushion 10 shown in FIGS. 1 and 2 is illustrated in FIGS. 3–8. In FIG. 3 is shown a first section of material 30 including a potentially preferred pattern for a plurality of fold lines. As shown, this first section of material 30 is preferably of a generally quadrilateral and more specifically a square configuration although it is to be understood that alternative polygonal geometries having a plurality of perimeter edges such as triangles, pentagons, hexagons and octagons may also be utilized. In formation of the inflatable restraint cushion 10, the first section of material 30 is preferably folded along fold lines as indicated.

In a potentially preferred practice, a first flap section F1 of the first section of material 30 is folded along fold line A-A located in opposing relation to a first perimeter edge 31 of the first section of material 30. While the fold line A-A is illustrated as being in generally parallel orientation with respect to the first perimeter edge 31, it is to be understood that the desired opposing relation between these elements may also be achieved by non-parallel orientations. In the illustrated and potentially preferred practice, the first flap section F1 is folded back upon itself along fold line B-B which is located intermediate fold line A-A and the first perimeter edge 31. This fold along fold line B-B is preferably in reverse direction to the fold along fold line A-A. As best seen in FIG. 5, this folding operation gives rise to a "Z" profile folded lap or sandwich structure between the interior of the first section of material 30 and the first perimeter edge 31. This folded lap structure preferably includes a layered structure of three interior layers and an attachment margin outboard of the interior layers for attachment of a second section of material as described further below. It is to be appreciated that the term "Z" profile lap structure as used herein is intended to cover any fold structure having reverse directed laps without limitation to any specific relative orientation of such laps.

As shown in FIGS. 4 and 5, the final disposition of the first perimeter edge 31 subsequent to the above folding operation is preferably outboard of the overlapping interior layers to provide the attachment margin 33. This outboard disposition is preferably achieved by making the distance between the first perimeter edge 31 and the fold line B-B slightly greater than the distance between fold line A-A and fold line B-B. In the preferred practice, a second "Z" profile lap structure including an outboard attachment margin is formed by folding a second flap section F2 over along a fold line D-D located in opposing relation to a second perimeter edge 32 of the first section of material 30 and introducing a fold in reverse direction along a fold line E-E intermediate fold line D-D and the second perimeter edge 32.

The folded structure resulting from the above folding steps is shown in plan view in FIG. 4 and in profile representation in FIG. 5. As shown, a "Z" profile lap structure is preferably formed wherein fold lines B-B and E-E are lapped over fold lines A-A and D-D respectively to lie in an inboard orientation with respect thereto along the interior longitudinal disposition lines shown in FIG. 3. Accordingly, the first perimeter edge 31 and second perimeter edge 32 are shifted inwardly to preferably form outboard peripheral attachment margins 33 and 34 for use in the attachment of additional material structures. It will, of course, be recognized that the initial folds in each flap section may first be made along lines B-B and E-E and thereafter in reverse direction along lines A-A and D-D respectively to achieve the same construction as shown in FIGS. 4 and 5. Accordingly, it is to be understood that the terms "first fold", "second fold" etc. as used herein are not intended to define any specific required sequence of operations.

It is to be appreciated that the final folded disposition of fold lines B-B and E-E may extend beyond the center of the folded first section of material. FIG. 5A illustrates the profile of a first section of material folded according to the practice of extending the fold lines beyond the center of the material blank to form an overlapping structure. It is, of course, to be understood that a folded structure could also be formed wherein some folded flap structures extend beyond the center of the material blank while other folded flap structures do not.

While the folding operation may be terminated after the introduction of folds in one or two flap sections as illustrated and described above, in the potentially preferred practice the folding of the first section of material 30 is carried further by folding a third flap section F3 about fold line G-G located in opposing relation to a third perimeter edge 37 of the first section of material. The third flap section F3 is folded back upon itself along a fold line H-H located intermediate the third perimeter edge 37 and fold line G-G to create an overlapping "Z" profile lap structure similar to that described above.

In the illustrated and preferred practice, a fourth flap section F4 is thereafter folded inwardly about fold line I-I located in opposing relation to a fourth perimeter edge 38 of the first section of material 30. The fourth flap section F4 is folded back upon itself along a fold line J-J located intermediate the fourth perimeter edge 38 and fold line I-I to create an overlapping "Z" profile lap configuration.

The folded structure resulting from the above-described folding steps is illustrated in overhead view in FIG. 6 and shown in elevated perspective in FIG. 7. As shown, the manipulation of the third flap section F3 and the fourth flap section F4 results in an inward shifting of fold lines H-H and J-J to positions inboard of fold lines G-G and I-I respectively along the interior lateral disposition lines shown in FIGS. 3 and 4. As will be appreciated, the folding of third flap section F3 and fourth flap section F4 over the previously folded first and second flap sections F1 and F2 results in portions of the first section of material being formed into triple overlapping lap structures having nine layers of material.

In the illustrated and potentially preferred embodiment, the distance between the third and fourth perimeter edges 37 and 38 and opposing fold lines H-H and J-J is slightly greater than one half the width of third and fourth flap sections F3 and F4 respectively. Accordingly, an outer perimeter attachment margin is preferably formed around the entire perimeter of the first section of material as best illustrated in FIG. 6. It will be appreciated that this outer perimeter attachment margin may be of virtually any width although a width of at least 1 millimeter and more preferably at least 5 millimeters may be preferred to enhance the ease of attachment of the second section of material as described below. As will be understood, an attachment margin which is too narrow may lead to assembly difficulties since without a proper margin the overlapping interior layers may interfere with the attachment of a second material section as described below. Moreover, as will be described further below, making the attachment at some distance from the fold lines permits the attachment of a second section of material which is substantially larger than the folded portion of the first section thereby permitting an increase in the volume and control of the shape of the expanded cushion.

As best illustrated in FIG. 7, in the preferred assembly of the cushion of the present invention, a second section of material 40 corresponding to the base section 24 of the inflatable restraint cushion 10 illustrated in FIG. 2 is placed in opposing mating relation to the folded first section of material 30 and adjoined thereto within the attachment margins outboard of the overlapping interior layers. It is to be understood that while the second section of material 40 has been shown as overlying the first section of material 30 during the assembly practice, the second section of material 40 could likewise be placed in an underlying position prior to the attachment of the two sections.

The second section of material 40 may be composed at least in part of the same material as the first section of material 30 or may be of an entirely different composition to provide different response characteristics in the event of a collision. By way of example only and not limitation, the first section of material 30 may be formed from a low permeability fabric for use in contacting the vehicle occupant 12, while the second section of material 40 may be formed from a higher permeability material to facilitate venting of the inflation media.

In the illustrated embodiment, the second section of material 40 includes an inlet opening 26 for introduction of inflation media as is well known to those of skill in the art. It is to be appreciated, however, that such an inlet opening could likewise be disposed in the first section of material if desired. Moreover it will be appreciated that whichever section of material includes an inlet opening 26 may also include neck extensions and/or reinforcements (not shown) as may be useful in facilitating attachment to inflation devices, although the highly expansible nature of the folded cushion does not rely on such neck extensions to provide expanded depth of coverage. Moreover, it is to be understood that any cushion formed according to the present invention may also include tethers as are well known to those of skill in the art to provide additional control over expansion during deployment.

In the illustrated and potentially preferred embodiment of the invention, the second section of material 40 is shown as being completely separate from the first section of material 30. It is to be understood, however, that the second section of material may well form a part of the first section of material which is folded over into place in opposing relation to the folded first section of material following the introduction of one or more expansible lap structures as described above. By way of example only, folds may be introduced into the first, second and third flap sections F1, F2, F3 as described above, after which the fourth flap section F4 may be folded inwardly to cover the previously folded areas thereby forming an enclosure with three expansible sides.

The attachment of the second section of material 40 to the first section of material 30 is illustrated in plan view in FIG. 8. As shown, in the preferred practice four substantially straight seam lines 50, 51, 52 and 53 are used to join the second section of material to the outboard attachment margins at the perimeter edges of the folded first section of material 30, although non-straight seams could, of course, be utilized if desired. As will be appreciated, the introduction of these seam lines may be carried out entirely by sewing on a flat surface using equipment as is well known to those of skill in the art, thereby enhancing the ease of production. It is to be understood that while flat sewing may be the preferred method of attachment between the first and second sections of material, alternative methods of attachment such as adhesives, heat sealing and the like may likewise be utilized.

While the assembly of the inflatable restraint cushion illustrated in FIGS. 2-8 incorporates first and second sections of material 30, 40 which are substantially square in configuration, it is to be appreciated that the practice of the present invention is readily adaptable to a variety of geometries. By way of example, it is contemplated that the first and second sections of material may be of an elongated rectangular configuration giving rise to an elongated cushion 110 as illustrated in FIG. 9. As will be appreciated, this elongated configuration may be assembled in precisely the same manner as illustrated and described above in relation to a square configuration and may be adaptable for use in environments where coverage of a broad surface area is desired. It is also to be understood that the cushion of the present invention may be turned inside out following attachment of the first and second sections of material if desired so as to remove the seams from the outer surface.

While in the illustrated and potentially preferred practice of the present invention the non-folded second section of material 40 is adhered over the folded lap structures in the manner illustrated in FIG. 7, it is contemplated by the present invention that both the first and second sections of material may be folded and/or that the second section of material may be attached to the first section of material from either side. Accordingly, multiple different assembly relationships are contemplated within the scope of the present invention. By way of example only and not limitation, several of these assembly relationships are illustrated schematically in FIGS. 10 through 17, wherein the first section of material is identified by reference numerals 230, 330, 430, 530, 630, 730, 830 and 930 and the second section of material is identified by reference numerals 240, 340, 440, 540, 640, 740, 840 and 940 respectively.

It is contemplated that the first and second sections of material in any of the assembly relationships may be provided with an intermediate barrier element member 60 as shown in FIG. 17. As will be appreciated, the use of such an intermediate barrier element may be used to at least partially segregate portions of the resulting enclosure thereby defining at least two different compartments. It is to be appreciated, of course, that while the use of the intermediate barrier element 60 has been illustrated in conjunction with the assembly relationship as illustrated in FIG. 12, the use of such a barrier element is likewise amenable to use in any other assembly relationship including those illustrated in FIGS. 7, 10, 11, 13, 14, 15 and 16. Moreover, it is contemplated that a double "Z" profile lap structure as shown in FIG. 16 may be used on any embodiment to effect further expansion if desired.

As indicated previously, the present invention is adaptable to produce cushion geometries having greater complexity than the substantially symmetrical square and rectangular box configurations as shown in FIGS. 2 and 9. One such alternative is illustrated in FIGS. 18, 19 and 20 wherein the first fabric section 1030 includes fold lines oriented with respect to one another to produce broad attachment margins outboard of the overlapping interior folds. As will be appreciated, a second section of material may be joined to these broad attachment margins in substantially the same manner as illustrated and described in relation to FIGS. 7 and 8 although the distance between the outer most fold line and the seam line will be substantially greater. Joining the second section of material to the outer portion of a broad attachment margin permits the cushion to have an expanded configuration with a broad base and a body which extends to a more narrow top, thereby yielding a final expanded shape generally in the form of a truncated pyramid.

In the potentially preferred practice of the present invention using the material section 1030 having fold lines as illustrated in FIG. 18, a "Z" profile lap structure is introduced by making a longitudinal fold along line L-L and introducing a fold in the opposite direction along line M-M in the manner previously described. In like manner, a longitudinal "Z" profile lap structure is introduced by placing a fold along line N-N and making a reverse fold along line O-O. Lateral folds are introduced by making a fold along line P-P and a reverse fold along line Q-Q as well as a fold along line R-R and a reverse fold along line S-S.

It is to be understood that the distance between the first perimeter edge 1031 and fold line M-M is substantially larger than the distance between fold line M-M and fold line L-L thereby yielding a wide outboard attachment margin equal to the difference. In like manner, the distance between the second perimeter edge 1032 and fold line O-O is substantially larger than the distance between fold line O-O and N-N thereby yielding another broad attachment margin. As shown, the distance between the third perimeter edge 1037 and fold line Q-Q is greater than the distance between fold line Q-Q and P-P. Finally, the distance between the fourth perimeter edge 1038 and fold line S-S is greater than that between fold line S-S and R-R. The folding of the material according to this pattern yields a folded piece of material similar to that illustrated in FIG. 6 but having extremely broad outboard attachment margins.

The attachment of a second section of material to the folded structure may be carried out in the same manner as illustrated and described in relation to the box-like configurations above except that the seam line is substantially outboard of the outermost fold line. Specifically, four seams 1050, 1051, 1052 and 1053 can be used to connect the first and second sections of material (FIG. 19).

In the folded configuration illustrated in FIG. 19 each of the attachment margins is substantially equivalent to the other attachment margins and the seam lines are located at a standard distance from each of the outboard perimeter edges. The expanded cushion which results from this folding and attachment practice is shown in FIG. 20. As shown, since the seam lines 1050-1053 are located at a substantial distance from the overlapping interior folds, a large second section of material may be adjoined around the attachment margin thereby yielding a broad base portion 1024. As shown, a body portion 1022 which corresponds to the folded first fabric section 1030 extends in a substantially symmetrical truncated pyramidal configuration extending from the broad base 1024 to a smaller top. It is to be understood that the substantially symmetrical configuration of the cushion illustrated in FIG. 20 is due to the symmetrical placement of each of the seam lines on the equivalent outboard attachment margins.

It will be appreciated that nonsymmetrical configurations may be achieved by altering the placement of the seam lines on the attachment margins or by incorporating attachment margins of different widths around the perimeter of the folded fabric section. By way of example only, and not limitation, broad outboard attachment margins could be formed at perimeter edges 1031 and 1032 with narrow attachment margins being formed at perimeter edges 1037 and 1038. As will be appreciated, the attachment of a second section of material about the outer edges of such attachment margins will have the result of modifying the expanded symmetrical truncated pyramid configuration illustrated in FIG. 20 to a more elongated, wedge-shaped structure.

As will be appreciated by those of skill in the art, the final inflated shape of the cushion 1010 will not have the straight sided configuration as illustrated for enablement purposes in FIG. 20, but will rather have a more rounded configuration due to the distribution of pressure throughout the enclosure. It is believed, however, that the general overall shape having a broad base and a more narrow top will nonetheless be maintained.

It is contemplated that the final geometry of the cushion of the present invention may be further altered and controlled by the introduction of angled folds in the lateral and/or longitudinal directions of the first section of material. As illustrated in FIG. 21, the fold lines are substantially similar to those illustrated and described in relation to FIG. 18, although the longitudinal folds run in non-parallel relation to one another to yield substantially trapezoidal webs of material between the fold lines. Moreover, the lateral fold lines are angled in opposite directions with respect to one another to yield differences in the slope of the cushion profile. The final cushion configuration 1110 which results from the use of a material section folded according to the pattern illustrated in FIG. 20 is a trapezohedron as illustrated in FIG. 21 wherein each side of the resultant cushion is a different sized trapezium thereby providing for a maximum differential in size and shape between each of the sides so as to generate an extremely complex overall geometry if desired. Once again, it is to be understood that the actual inflated configuration will be more rounded than the box-like structure shown, although the general configuration should be maintained.

It is to be understood that the introduction of non-parallel fold lines into one or more of the sections of material to form expansible segments of trapezoidal or triangular shape permits the final configuration of the inflatable restraint cushion to be greatly modified to meet individual design criteria since a broad portion of a folded structure will yield a deep expanded configuration resulting from a broad web of entrained material and a narrow portion of a folded structure will result in a correspondingly more shallow expanded structure. Thus, it is contemplated that the method of the present invention may provide an extensive number of different geometries wherein the expanded cushion has shallow and deep portions formed by different fold structures. Accordingly, while several potential embodiments have been illustrated and described, any number of other embodiments may likewise be utilized.

As indicated previously, a primary benefit of the present invention is the ability to form a three-dimensional expansible cushion by two-dimensional folding and adjoining practices. These folding and adjoining practices may be carried out by hand or may be effected by mechanized technologies. By way of example only, it is believed that the mechanized folding operations may be carried out by equipment utilizing sliding plate folding technologies as are well known to those of skill in the art. Likewise, the adjoining practices may be carried out utilizing standard industrial sewing equipment as is well known to those of skill in the art.

In accordance with the above description, it is seen that the present invention provides an inflatable restraint cushion and method of assembly therefore wherein the cushion may be formed entirely by flat folding and adjoining operations. While the present invention has been illustrated and described in accordance with certain preferred embodiments it is to be appreciated that such are not to be construed as unduly limiting the invention since modifications may be made and other embodiments of the principles of this invention will occur to those of skill in the art to which this invention pertains. It is therefore contemplated by the appended claims to cover any such modifications and equivalent embodiments as incorporate the features of this invention within the true spirit and scope of the following claims.

What is claimed is:

1. An occupant restraint cushion for inflation in a vehicle transporting at least one person, the occupant restraint cushion comprising:

a first section of material having a center and a perimeter including a plurality of perimeter edges, said first section of material including at least one "Z" profile lap structure comprising a first fold formed along a first fold line disposed in opposing relation to a first perimeter edge, and a second fold reverse in direction to said first fold disposed along a second fold line located between said first fold line and said first perimeter edge such that a portion of the material between said center and said first perimeter edge of said first section of material comprises a layered structure including a plurality of overlapping interior layers and an attachment margin disposed outboard of said overlapping interior layers;

a second section of material in opposed mating relation to said first section of material; and means for attaching said first section of material to said second section of material around the perimeter of said first section of material within said attachment margin to form an enclosure between said first and second sections of material.

2. The invention as in claim 1, wherein said first section of material includes at least two "Z" profile lap structures each including interior overlapping layers and attachment margins disposed outboard of said overlapping layers.

3. The invention as in claim 2, wherein at least two "Z" profile lap structures intersect one another.

4. The invention as in claim 2 wherein no two "Z" profile lap structures intersect.

5. The invention as in claim 1, wherein said second section of material includes at least one "Z" profile lap structure disposed therein.

6. The invention as in claim 1, wherein said first section of material is of a different air permeability than said second section of material.

7. The invention as in claim 1, wherein either said first section of material or said second section of material comprises a coated fabric.

8. The invention as in claim 1, wherein said means for attaching said first section of material to said second section of material comprise a plurality of stitched seams.

9. An occupant restraint cushion for inflation in a vehicle transporting at least one person, the occupant restraint cushion comprising:

a first section of material of quadrilateral geometry having a center and a perimeter comprising four perimeter edges, said first section of material including "Z" profile lap structures adjacent each of said four perimeter edges, said "Z" profile lap structures each comprising a first fold disposed along a first fold line and a second fold in reverse direction to said first fold said second fold being disposed along a second fold line between said first fold line and the perimeter of said first section of material such that each of said "Z" profile lap structures includes a plurality of overlapping interior layers and attachment margins outboard of said overlapping interior layers;

a second section of material of quadrilateral geometry in opposed mating relating to said first section of material; and a plurality of seams for attaching said first section of material to said second section of material around the perimeter of said first section of material within said attachment margins outboard of said overlapping interior layers.

10. The invention as in claim 9, wherein said plurality of seams are straight seams formed by flat sewing operations.

11. The invention as in claim 9, wherein said plurality of seams are formed by adhesive means.

12. A method of manufacturing an occupant restraint cushion for use in conjunction with inflation equipment in a vehicle transporting at least one person, the method comprising the steps of:

applying a first fold to a first section of material having a center and a plurality of perimeter edges along a fold line disposed in opposing relation to a first perimeter edge of said first section of material;

applying at least a second fold to said first section of material along a fold line disposed between the fold line for said first fold and said first perimeter edge of said first section of material in reverse direction to said first fold, such that at least a portion of the material disposed between said first perimeter edge of said first section of material and said center of said first section of material is formed into a "Z" profile lap structure including a multiplicity of overlapping interior layers and an attachment margin outboard of said overlapping interior layers;

placing a second section of material in contacting relation with said first section of material; and adjoining said second section of material to said first section of material folded according to the above steps within the attachment margin outboard of said overlapping interior layers.

13. The method as in claim 12, wherein said second section of material is adjoined to said first section of material by sewing inside the entire perimeter of said first section of material.

14. The method as in claim 12, wherein said second section of material includes at least one folded lap structure along a perimeter edge thereof.

15. The method as in claim 12, including the further intermediate steps prior to the adjoining step of:

applying a third fold to said first section of material along a fold line disposed in opposing relation to a second perimeter edge of said first section of material; and applying at least a fourth fold to said first section of material along a fold line disposed between the fold line for said third fold and said second perimeter edge of said first section of material in reverse direction to said third fold, such that at least a portion of the material disposed between said second perimeter edge and said center of said first section of material is formed into a "Z" profile lap structure including a multiplicity of overlapping interior layers and an attachment margin outboard of said overlapping interior layers.

16. The method as in claim 15, wherein said first perimeter edge and said second perimeter edge intersect one another.

17. The method as in claim 15, wherein said first perimeter edge and said second perimeter edge do not intersect one another.

18. The method as in claim 15, wherein said second section of material is adjoined to said first section of material by sewing inside the entire perimeter of said first section of folded material including within said attachment margins of said "Z" profile lap structures.

19. The method as in claim 15, wherein said second section of material includes at least one folded lap structure along a perimeter edge thereof.

20. The method as in claim 15, including the further intermediate steps prior to the adjoining step of:

applying a fifth fold to said first section of material along a fold line disposed in opposing relation to a third perimeter edge of said first section of material; and applying at least a sixth fold to said first section of material along a fold line disposed between the fold line of said fifth fold and said third perimeter edge of said first section of material in reverse direction to said fifth fold, such that at least a portion of the material disposed between said third perimeter edge and said center of said first section of material is formed into a "Z" profile lap structure including a multiplicity of overlapping interior layers and an attachment margin outboard of said overlapping interior layers.

21. The method as in claim 20, wherein said second section of material is adjoined to said first section of material by sewing inside the entire perimeter of said first section of material including within said attachment margins of said "Z" profile lap structures.

22. The method as in claim 20, wherein said second section of material includes at least one folded lap structure along a perimeter edge thereof.

23. The method as in claim 20, including the further intermediate steps, prior to the adjoining step, of:

applying a seventh fold to said first section of material along a fold line disposed in opposing relation to a fourth perimeter edge of said first section of material; and applying at least an eighth fold to said first section of material along a fold line disposed between the fold line for said seventh fold and said fourth perimeter edge of said first section of material in reverse direction to said seventh fold, such that at least a portion of the material disposed between said fourth perimeter edge and said center of said first section of material is formed into a "Z" profile lap structure including a multiplicity of overlapping layers and a attachment margin outboard of said overlapping layers.

24. The method as in claim 23, wherein said first section of material is of a quadrilateral geometry.

25. The method as in claim 23, wherein said second section of material is adjoined to said first section of material by sewing within the entire perimeter of said first section of material including within the attachment margin formed by said "Z" profile lap structures following application of said first through eighth folds.

26. The method as in claim 23, wherein said first through eighth folds are applied to said first section of material in sequential order.

27. A method of manufacturing an occupant restraint cushion from two pieces of fabric each having a plurality of perimeter edges for use in conjunction with inflation equipment in a vehicle transporting at least one person, the method comprising the steps of:

applying a first fold to a first piece of fabric along a fold line disposed in opposing relation to a first perimeter edge;

applying a second fold to said first piece of fabric along a fold line disposed between the fold line of said first fold and said first perimeter edge in reverse direction to said first fold, such that at least a portion of the fabric disposed between said first perimeter edge and said center of said first piece of fabric is formed into a first "Z" profile lap structure having at least three overlapping interior layers and an attachment margin outboard of said overlapping interior layers;

applying a third fold to said first piece of fabric along a fold line disposed in opposing relation to a second perimeter edge;

applying a fourth fold to said first piece of fabric along a fold line disposed between the fold line of said third fold and said second perimeter edge in reverse direction to said third fold, such that at least a portion of the material disposed between said second perimeter edge and said center of said first piece of fabric is formed into a second "Z" profile lap structure including at least three overlapping interior layers and a second attachment margin outboard of said overlapping interior layers;

applying a fifth fold to said first piece of fabric along a fold line disposed in opposing relation to a third perimeter edge;

applying a sixth fold to said first piece of fabric along a fold line disposed between the fold line of said fifth fold and said third perimeter edge in reverse direction to said fifth fold, such that at least a portion of the fabric disposed between said third perimeter edge and said center of said first piece of fabric is formed into a third "Z" profile lap structure including at least three overlapping interior layers and a third attachment margin outboard of said overlapping interior layers;

applying a seventh fold to said first piece of fabric along a fold line disposed in opposing relation to a fourth perimeter edge;

applying at least an eighth fold to said first piece of fabric along a fold line disposed between the fold line of said seventh fold and said fourth perimeter edge in reverse direction to said seventh fold, such that at least a portion of the fabric disposed between said fourth perimeter edge and said center of said first piece of material is formed into a fourth "Z" profile lap structure including at least three overlapping interior layers and a fourth attachment margin outboard of said overlapping interior layers;

placing a second piece of fabric in mating relation with said first piece of fabric folded according to the above steps; and adjoining said second piece of fabric to said first piece of fabric by means of sewing within the perimeter of said first piece of fabric within said first through fourth attachment margins.

28. The method as in claim 27, wherein said first piece of fabric is quadrilateral in shape.

29. The method as in claim 27, wherein said first fold, said second fold and said first perimeter edge are not parallel to one another.

30. The method as in claim 29, wherein said third fold, said fourth fold and said second perimeter edge are not parallel to one another.

31. The method as in claim 30, wherein said fifth fold, said sixth fold and said third perimeter edge are not parallel to one another.

32. The method as in claim 31, wherein said seventh fold, said eighth fold and said fourth perimeter edge are not parallel to one another.

33. The method as in claim 27 wherein said first through eighth folds are introduced sequentially.

* * * * *